Nov. 20, 1923.  
O. W. GERLEMAN  
MEANS OF LUBRICATION  
Filed Jan. 27, 1922  
1,474,819
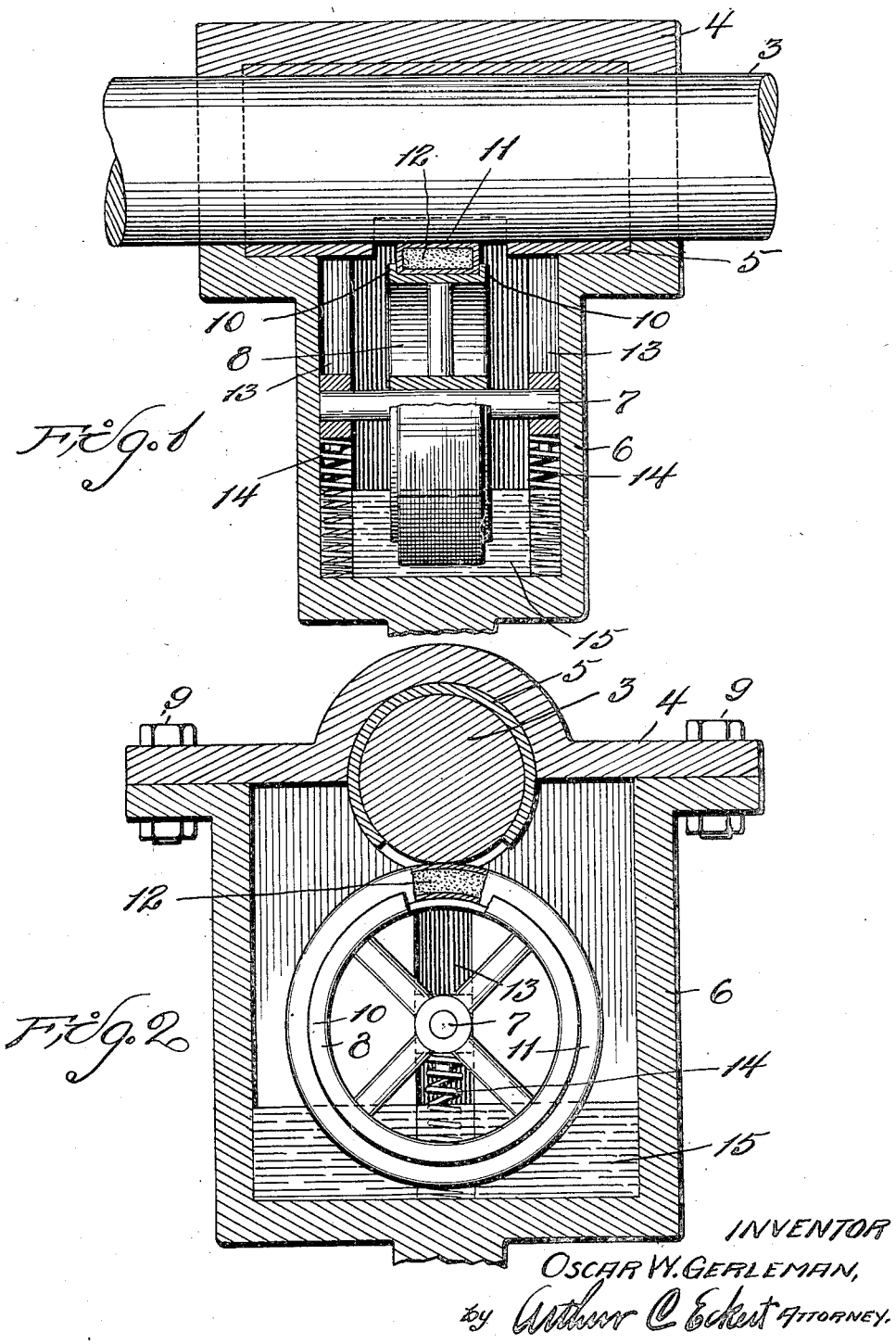
INVENTOR  
OSCAR W. GERLEMAN,  
by Arthur C. Eckert ATTORNEY.

Patented Nov. 20, 1923.

1,474,819

UNITED STATES PATENT OFFICE.

OSCAR W. GERLEMAN, OF ST. LOUIS, MISSOURI.

MEANS OF LUBRICATION.

Application filed January 27, 1922. Serial No. 532,265.

*To all whom it may concern:*

Be it known that OSCAR W. GERLEMAN, a citizen of the United States of America, residing at 110 South Tenth Street, in the city of St. Louis and State of Missouri, has invented certain new and useful Improvements in Means of Lubrication, of which the following is a specification.

The object of my invention is to provide a method and means of lubrication which will bring about a proper distribution of graphite and oil and which will place the lubricant at the exact surface desired and in the proper amount. For proper lubrication, both oil and graphite are necessary; the graphite minimizes the frictional wear and the oil maintains a minimum temperature. The amount of graphite that can be successfully, practically used must be a relatively small amount as compared to the oil. It is impractical to mix the oil and graphite for the reason that the graphite is not soluble in the oil and is rapidly precipitated through the oil at the bottom of the oil container. My object is to present a definite known quantity of oil and graphite to the bearing surface. With these and other objects in view, my invention has relation to certain novel features of construction and arrangement of parts as will be hereinafter more fully described, pointed out in the claims, and illustrated in the drawings, in which—

Fig. 1 is a vertical section through a bearing, shaft and oil well and

Fig. 2 is a transverse section through the center of Fig. 1.

Numeral 3 designates a conventional shaft and numeral 4 a journal box with the conventional babbitt bearing 5. Numeral 6 designates a conventional oil well in the sides of which is journaled the shaft 7 on which is mounted the flanged rim wheel 8. The journal box 4 is secured to the oil well 6 by means of the bolts 9. On the periphery of the wheel 8 within the flanges 10 is positioned a perforated tubular member 11. The perforated tubular member 11 is held in frictional engagement with the wheel 8. Graphite 12 is positioned on the inside of the perforated tubular member. The wheel 8 is so positioned relative the shaft 3 that the periphery of the perforated tubular member 11 is in rolling frictional contact with the bearing surface of the shaft 3. In order to secure this frictional contact between the perforated tubular member 11 and the shaft 3, slots 13 are formed in the oil well 6 beneath the shaft 7. Coiled springs 14 are positioned in the slots 13 and are so formed as to normally secure the wheel 8 in the said relationship with the shaft 3. It will be seen that on a rotation of the shaft 3 that the wheel 8 and, therefore, the perforated tubular member 11 will be rotated. Numeral 15 designates the oil in the oil well 6. In the rotation of the perforated tubular member 11 with the wheel 8 said perforated tubular member is dipped into the oil 15 at the lower portion of its revolution, and the oil carried upward to the bearing surface of the shaft 3. The perforated tubular member 11 is preferably made of a fabric which permits of a capillary action thereby drawing the oil from the well to the bearing surface of the shaft 3 even when the perforated tubular member 11 is stationary. In other words, the oil is brought from the well to the active bearing surface of the shaft 3 both by the capillary action of the fabric of the perforated tubular member 11 and physically by the rotation of the perforated tubular member 11. The graphite 12 in the perforated tubular member 11 is of such size and composition that it will be forced through the perforations of the peripheral surface of the perforated tubular member and deposited on the bearing surface of the shaft 3. By selecting the proper sized flakes of graphite and the amount of graphite, and the pressure of the perforated tubular member 11 against the bearing surface of the shaft 3 and by selecting the mesh of the fabric of which the perforated tubular member 11 is made, an exact selective amount of graphite can be fed to the surface of the shaft 3.

I do not desire to be limited to my specific means of presenting a definite amount of graphite to the bearing surface. I have disclosed the instant means as being one of the practical preferred means.

What I claim and mean to secure by Letters Patent is—

1. In combination with a bearing, a shaft operatively secured in said bearing, an oil well in operative relationship with said bearing, a wheel rotatively mounted in said oil well, a perforated tubular graphite containing member mounted on the periphery of said wheel in operative rotative contact with the bearing surface of said shaft.

2. In combination with a bearing, a shaft operatively secured in said bearing, an oil well operatively secured to said bearing, a wheel rotatively secured in said oil well, a perforated tubular graphite containing member positioned on the periphery of said wheel in rolling contact with the bearing surface of said shaft, and means of selectively maintaining a determined pressure between said shaft and said perforated tubular member.

In testimony whereof I affix my signature.

OSCAR W. GERLEMAN.